(12) United States Patent
Zhu et al.

(10) Patent No.: US 10,724,883 B2
(45) Date of Patent: Jul. 28, 2020

(54) METHOD FOR ASCERTAINING A PHYSICAL PARAMETER OF A GAS

(71) Applicant: Endress+Hauser Flowtec AG, Reinach (CH)

(72) Inventors: Hao Zhu, Freising (DE); Alfred Rieder, Landshut (DE); Gerhard Eckert, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 237 days.

(21) Appl. No.: 15/749,888

(22) PCT Filed: Jul. 26, 2016

(86) PCT No.: PCT/EP2016/067716
§ 371 (c)(1),
(2) Date: Feb. 2, 2018

(87) PCT Pub. No.: WO2017/021198
PCT Pub. Date: Feb. 9, 2017

(65) Prior Publication Data
US 2018/0231411 A1    Aug. 16, 2018

(30) Foreign Application Priority Data

Aug. 3, 2015   (DE) .................. 10 2015 112 737

(51) Int. Cl.
*G01F 1/84* (2006.01)
*G01N 9/00* (2006.01)
*G01F 15/04* (2006.01)

(52) U.S. Cl.
CPC ............ *G01F 1/8436* (2013.01); *G01F 15/04* (2013.01); *G01N 9/002* (2013.01); *G01F 1/8468* (2013.01); *G01N 2009/006* (2013.01)

(58) Field of Classification Search
None
See application file for complete search history.

(56) References Cited

U.S. PATENT DOCUMENTS

| 4,262,523 A | 4/1981 | Stansfeld | |
|---|---|---|---|
| 4,680,974 A * | 7/1987 | Simonsen | G01F 1/8431 73/861.357 |

(Continued)

FOREIGN PATENT DOCUMENTS

| CN | 101194148 A | 6/2008 |
|---|---|---|
| CN | 102216739 A | 10/2011 |

(Continued)

OTHER PUBLICATIONS

Hemp et al., "Theory of errors in Coriolis flowmeter readings due to compressibility of the fluid being metered" Flow Measurement and Instrumentation 17 (2006) 359-369 (Year: 2006).*

(Continued)

*Primary Examiner* — John C Kuan
(74) *Attorney, Agent, or Firm* — Kelly J. Smith; PatServe

(57) ABSTRACT

The invention relates to a method for ascertaining a physical parameter of a gas using a measuring transducer having a measuring tube for conveying the gas, wherein the measuring tube is excitable to execute bending oscillations of different modes and eigenfrequencies, the method includes: ascertaining the eigenfrequency of the f1-mode and f3-mode; ascertaining preliminary density values for the gas based on the eigenfrequencies of the f1-mode and f3-mode; ascertaining a value for the velocity of sound of the gas, and/or, dependent on the velocity of sound and the eigenfrequency of a mode, at least one correcting term and/or density error for the preliminary density value; and/or a correcting term for a preliminary mass flow value for determining a corrected mass flow measured value based on (Continued)

the first preliminary density value, the second preliminary density value, the eigenfrequencies of the f1-mode and f3-mode.

15 Claims, 4 Drawing Sheets

(56) References Cited

U.S. PATENT DOCUMENTS

| | | | | |
|---|---|---|---|---|
| 5,728,952 | A * | 3/1998 | Yao | G01F 1/8418 |
| | | | | 73/32 A |
| 5,753,827 | A * | 5/1998 | Cage | G01F 1/8409 |
| | | | | 73/32 A |
| 5,965,824 | A * | 10/1999 | Kishiro | G01F 1/849 |
| | | | | 73/32 A |
| 6,763,730 | B1 * | 7/2004 | Wray | G01F 1/8404 |
| | | | | 73/861.355 |
| 2007/0180929 | A1 * | 8/2007 | Rieder | G01F 1/74 |
| | | | | 73/861.17 |
| 2011/0264385 | A1 | 10/2011 | Weinstein et al. | |

FOREIGN PATENT DOCUMENTS

| | | |
|---|---|---|
| DE | 19652002 A1 | 6/1997 |
| EP | 1190221 B1 | 3/2004 |
| EP | 2026042 A1 | 2/2009 |
| WO | 0101086 A1 | 1/2001 |

OTHER PUBLICATIONS

Search Report for German Patent Application No. 10 2015 112 737.7, German Patent Office, dated Feb. 4, 2016, 5 pp.
Search Report for International Patent Application No. PCT/EP2016/067716, WIPO, dated Oct. 27, 2016, 11 pp.

* cited by examiner

METHOD FOR ASCERTAINING A PHYSICAL PARAMETER OF A GAS

CROSS-REFERENCE TO RELATED APPLICATIONS

The present application is related to and claims the priority benefit of German Patent Application No. 10 2015 112 737.7, filed on Aug. 3, 2015 and International Patent Application No. PCT/EP2016/067716 filed on Jul. 26, 2016, the entire contents of which are incorporated herein by reference.

TECHNICAL FIELD

The present invention relates to a method for ascertaining a physical parameter of a gas by means of a measuring transducer having at least one measuring tube for conveying the gas, wherein the measuring tube has an inlet-side end section and an outlet-side end section, wherein the measuring transducer has at least one inlet-side securement apparatus and one outlet-side securement apparatus, with which the measuring tube is secured in the end sections, wherein the measuring tube is excitable to execute oscillations between the two securement apparatuses, wherein mass flow and density of the gas are determinable from the oscillatory behavior of the measuring tube. The measured values for mass flow and density have, however, cross sensitivities to the velocity of sound, and to the compressibility of the gas. A compensation of these cross sensitivities is, consequently, desired.

BACKGROUND

The publication WO 01/01086 A1 discloses a method for compressibility compensation in the case of mass flow measurement in a Coriolis mass flow meter. In such case, a mass flow measurement is performed in two different modes, of which one is a bending oscillation mode and another a radial mode. The mass flow values ascertained by means of these two modes are compared. This is, however, a problematic approach, because the radial mode oscillations are significantly dependent on the flow profile and the static pressure. Additionally, more than the usual two sensors are required, in order to be able to register both bending oscillations as well as also radial mode oscillations. Equally, a more complex exciter structure is required.

SUMMARY

It is, consequently, an object of the present invention to provide a measuring method with a more robust and at the same time simpler compensation of cross sensitivities as regards compressibility and velocity of sound. The object is achieved according to the invention by the method as defined in the independent patent claim.

The method of the invention is a method for ascertaining a physical parameter of a gas by means of a measuring transducer having at least one measuring tube for conveying the gas, wherein the measuring tube has an inlet-side end section and an outlet-side end section, wherein the measuring transducer has at least one inlet-side securement apparatus and one outlet-side securement apparatus, with which the measuring tube is secured in the end sections, wherein the measuring tube is excitable between the two securement apparatuses to execute bending oscillations of different modes with different eigenfrequencies, of which an f1-mode has no oscillation nodes between the securement apparatuses, and wherein an f3-mode has two oscillation nodes between the securement apparatuses, wherein the method comprises steps as follows: ascertaining the eigenfrequencies of the f1-mode and of the f3-mode; ascertaining a first preliminary density value for the gas conveyed in the measuring tube based on the eigenfrequency of the f1-mode; ascertaining a second preliminary density value for the gas conveyed in the measuring tube based on the eigenfrequency of the f3-mode; ascertaining a value for the velocity of sound of the gas conveyed in the measuring tube, and/or, dependent on the velocity of sound and the eigenfrequency of a mode, at least one correcting term and/or density error for the preliminary density value ascertained based on the eigenfrequency of the mode, for determining a corrected density measured value; and/or a correcting term for a preliminary mass flow value for determining a corrected mass flow measured value based on the first preliminary density value, the second preliminary density value, the eigenfrequency of the f1-mode and the eigenfrequency of the f3-mode.

To a first approximation, the relationship of a preliminary density value $\rho_i$ of a gas based on the eigenfrequency $f_i$ of an $f_i$-mode can be described as:

$$\rho_i = c_{0i} + c_{1i}\frac{1}{f_i^2} + c_{2i}\frac{1}{f_i^4},$$

wherein $c_{0i}$, $c_{1i}$, and $c_{2i}$, are mode dependent coefficients.

The above approximation does not, however, take into consideration the influence of the oscillating gas in the measuring tube. The nearer the resonant frequency of the oscillating gas is to the eigenfrequency of a bending oscillation mode, the greater is the influence of the eigenfrequency. Since the resonant frequency of the gas lies, usually, above the eigenfrequency of the measuring tubes, the influence of the f3-bending oscillation mode is greater than the influence of the f1-bending oscillation mode. This leads to different preliminary, mode specific, density values, wherein the ratio between the preliminary density values provides the opportunity for ascertaining and correcting the influence of the oscillating gas.

The resonant frequency of the oscillating gas depends on its velocity of sound. In a further development of the invention, a mode specific correcting term $K_i$ for a preliminary density value is, consequently, a function of a quotient of the velocity of sound of the gas and the eigenfrequency of the mode, with which the preliminary density measured value was ascertained.

In a further development of the invention, the velocity of sound c of the gas is determined by finding that sound velocity value, for which the quotient of the first correcting term for the first preliminary density value divided by the second correcting term for the second preliminary density value equals the quotient of the first preliminary density value divided by the second preliminary density value. Which mathematical procedure is used, in such case, is of lesser importance.

In a further development of the invention, the correcting term $K_i$ for the preliminary density values $\rho_i$ has the following form based on the eigenfrequency of the $f_i$-mode:

$$K_i := \left(1 + \frac{r}{\left(\frac{g \cdot c}{f_i}\right)^2 - b}\right),$$

-continued wherein $$\rho_{corr} := \frac{\rho_i}{K_i}$$

wherein r and g are gas independent constants, c is the velocity of sound of the gas, $f_i$ the eigenfrequency of the $f_i$-mode, $\rho_{corr}$ the corrected density, and b a scaling constant, wherein especially: r/b<1, especially r/b<0.9, and/or b=1.

In a further development of the invention, g in the above equation is a proportionality factor between a resonant frequency $f_{res}$ of the gas and the velocity of sound of the gas dependent on the diameter of the measuring tube, wherein:

$$f_{res} = g \cdot c$$

In a further development of the invention, the preliminary density values are determined based on the eigenfrequencies of the $f_i$-modes by means of polynomials in $1/f_i$, especially in $(1/f_i)^2$, wherein the coefficients of the polynomials are mode dependent.

In a further development of the invention, the following holds for a density error $E_{\rho i}$ of a preliminary density value based on the eigenfrequency of the fi-mode:

$$E_{\rho i} := K_i - 1,$$

wherein a mass flow error $E_m$ of a preliminary mass flow value is proportional to the density error $E_{\rho 1}$ of the first preliminary density value, thus:

$$E_m := k \cdot E_{\rho 1},$$

wherein the proportionality factor k amounts to not less than 1.5, for example, not less than 1.8 and especially not less than 1.9, wherein the proportionality factor k amounts to no more than 3, for example, no more than 2.25 and especially no more than 2.1. In a currently preferred embodiment of the invention, the proportionality factor amounts to k=2.

For a correcting term $K_m$ for the mass flow, the following holds:

$$K_m := 1 + E_m,$$

wherein the corrected mass flow $\dot{m}_{corr}$ is ascertained as $$\dot{m}_{corr} := \frac{\dot{m}_v}{K_m},$$

and
wherein $\dot{m}_v$ is the preliminary mass flow value.

In a further development of the invention, the method further includes steps as follows: determining a deviation between the first preliminary density value based on the eigenfrequency of the f1-mode and the second preliminary density value based on the eigenfrequency of the f3-mode; testing whether the deviation is greater than a reference value; and, when this is the case, ascertaining and, in given cases, outputting a value for the velocity of sound.

In a further development of the invention, the reference value for the deviation of the density values is so selected that the velocity of sound can be determined with a statistical error of no more than 10%, especially no more than 5% and preferably no more than 2%.

In a further development of the invention, the reference value amounts to not less than 0.2 kg/m³, especially not less than 0.4 kg/m³, wherein the reference value further amounts to no more than 2 kg/m³, for example, no more than 1 kg/m³, and especially no more than 0.6 kg/m³.

BRIEF DESCRIPTION OF THE DRAWINGS

The invention will now be explained in greater detail based on the example of an embodiment presented in the drawing, the figures of which show as follows.

DETAILED DESCRIPTION

Figure 1:
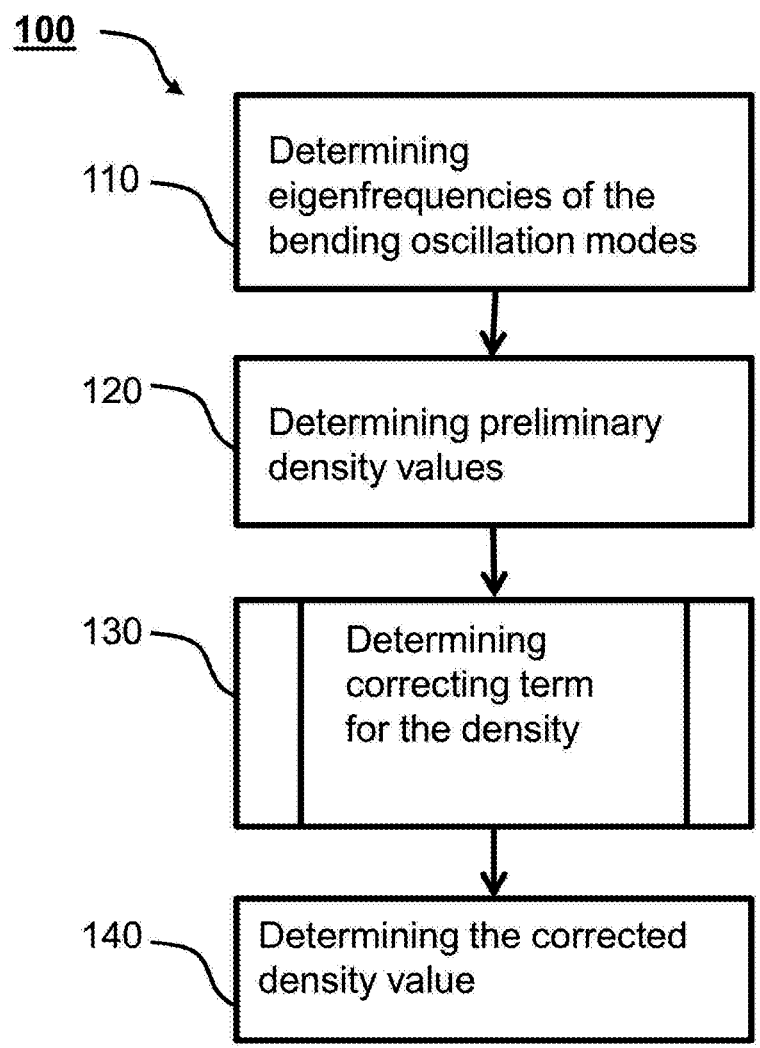
FIG. 1 shows a flow diagram for a first example of an embodiment of a method of the invention.

The example of an embodiment of a method 100 of the invention shown in FIG. 1 for determining a density value begins in a step 110 with the determining of the eigenfrequencies of the f1-bending oscillation mode and of the f3-bending oscillation mode. For this, the f1-bending oscillation mode and the f3-bending oscillation mode can especially be excited simultaneously. The sought eigenfrequencies can be ascertained by maximizing the ratio of oscillation amplitude to mode specific excitation power by varying the excitation frequencies.

Based on the ascertained eigenfrequencies fi, in a step 120, preliminary density values $\rho_1$ and $\rho_3$ are determined as:

$$\rho_i = c_{0i} + c_{1i} \frac{1}{f_i^2} + c_{2i} \frac{1}{f_i^4},$$

wherein $c_{0i}$, $c_{1i}$, and $c_{2i}$, are mode dependent coefficients.

In a step 130, which is explained below in greater detail based on FIGS. 2 to 4, a correcting term for the density measurement is determined.

Finally in a step 140, a corrected density value is determined by means of the correcting term.

Figure 2:
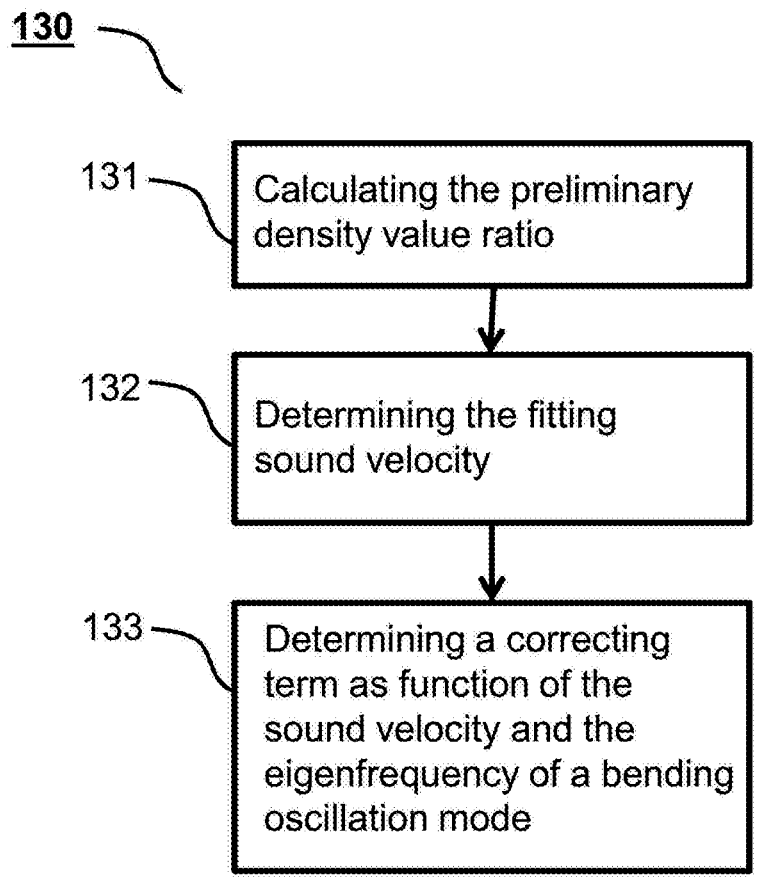
FIG. 2 shows a flow diagram for a detail of the first example of an embodiment of the method of the invention.

As shown in FIG. 2, step 130 for determining the correcting term includes, firstly, in a step 131, the calculating of the ratio V of the preliminary density values, thus, for example, by dividing the preliminary density values $\rho_i$ and $\rho_3$ to give $V := \rho_1/\rho_3$.

Then, in a step 132, that velocity of sound c is determined, which at the measured eigenfrequencies of the bending oscillation modes leads to the calculated ratio V of the preliminary density values:

$$\frac{\left(1 + \dfrac{r}{\left(\frac{g \cdot c}{f_1}\right)^2 - b}\right)}{\left(1 + \dfrac{r}{\left(\frac{g \cdot c}{f_3}\right)^2 - b}\right)} = V$$

wherein r is, for instance, 0.84, b=1 and g a measuring tube dependent proportionality factor between velocity of sound and resonant frequency, which can assume, for example, a value of 10/m.

Figure 3:
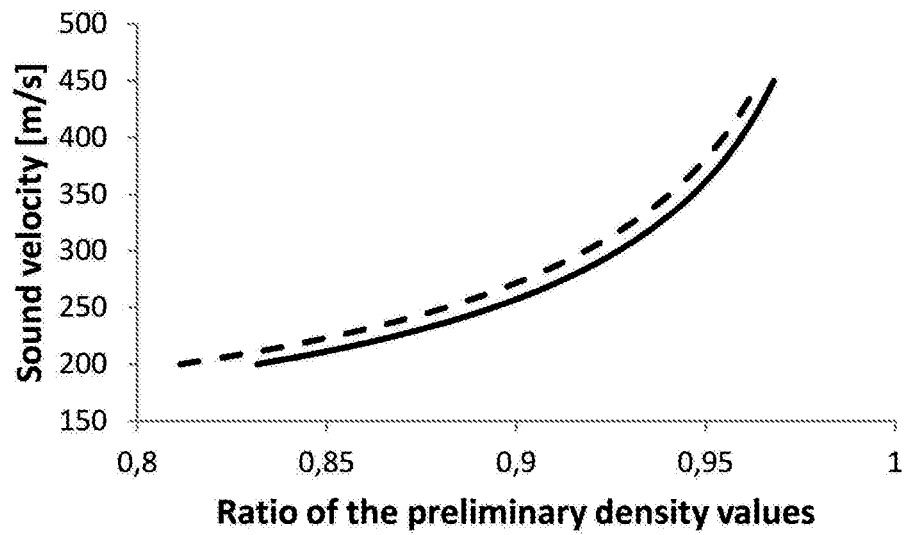
FIG. 3 shows a graph of velocity of sound versus ratio of the density measured values.

FIG. 3 shows velocity of sound as a function of the ratio V of the preliminary density values for two different value pairs of eigenfrequencies of the bending oscillation modes. The solid line is for f1=200 Hz and f3=900 Hz and the dashed line is for f1=210 Hz and f3=950 Hz. Thus, for example, at f1=200 Hz and f3=900 Hz, a velocity of sound of, for instance, c=360 m/s fulfills the condition, V=0.95, f1=200 Hz and f3=900 Hz.

Based on the ascertained velocity of sound, then in step 133 of the method in FIG. 2 a mode specific correcting term $K_i$ is calculated according to:

$$K_i := \left(1 + \frac{r}{\left(\frac{g \cdot c}{f_i}\right)^2 - 1}\right).$$

The preliminary density value $\rho_i$ is, finally, calculated in the step 140 of the method in FIG. 1 according to:

$$\rho_{corr} := \frac{\rho_i}{K_i}.$$

The preliminary density value $\rho_i$ is thus divided by the correcting term $K_i$ in order to obtain the corrected density value $\rho_{corr}$.

Figure 4:
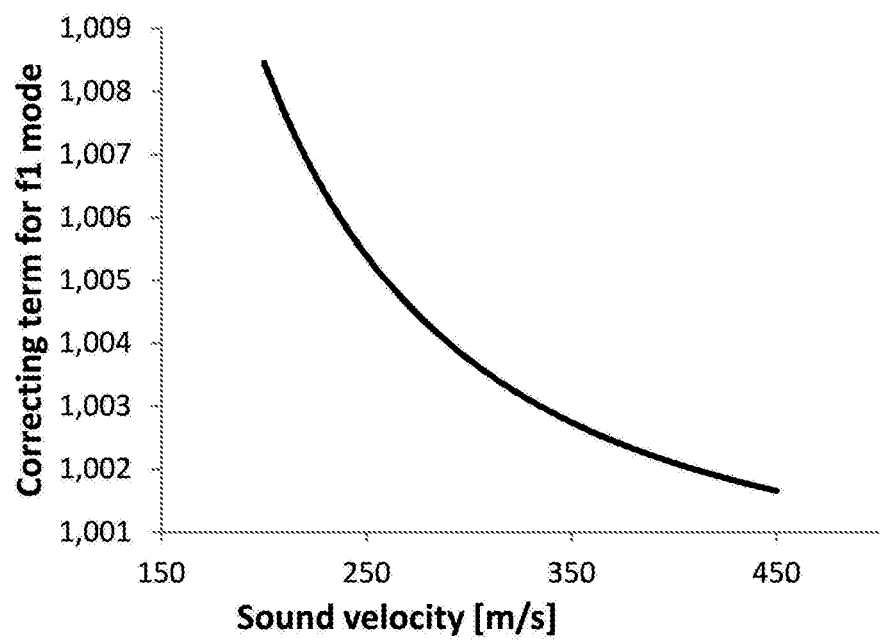
FIG. 4 shows a graph of density correction value versus velocity of sound.

FIG. 4 shows the correcting term $K_i$ ascertained in step 133 for the f1 mode in the case of an eigenfrequency of f1=200 Hz. According to the velocity of sound of c=360 m/s ascertained in step 132, the preliminary density value based on the eigenfrequency of the f1-bending oscillation mode would be, for instance, 0.26% too large. The preliminary density value is thus divided by the correcting term 1.0026, in order to obtain the corrected density value.

Figure 5A:
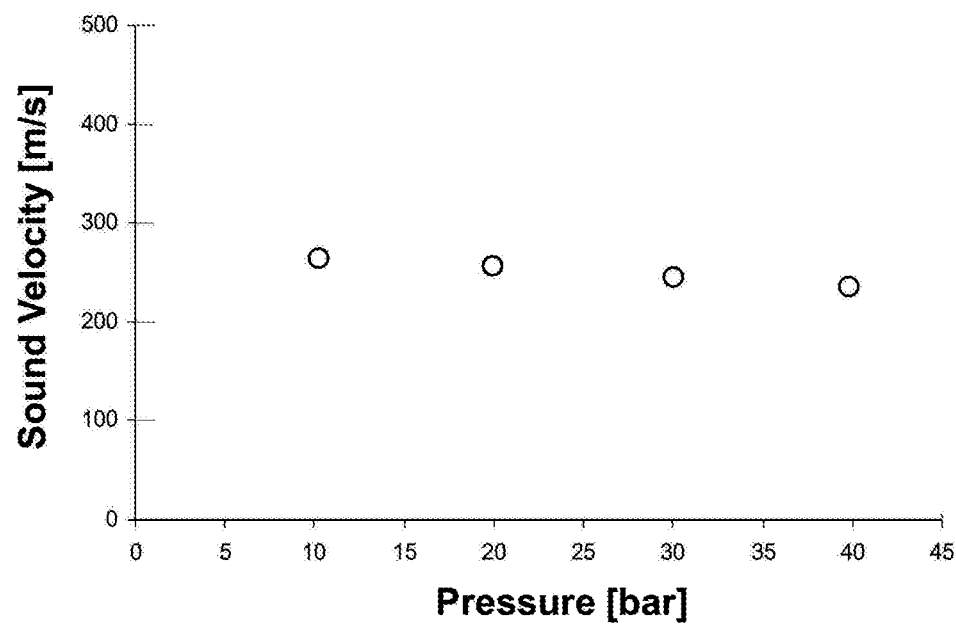
FIG. 5a shows a graph of sound velocity values ascertained with the method of the invention.

Shown in FIG. 5a are results of determining the velocity of sound of $CO_2$ by means of the method of the invention in the case of different values for the static pressure. In the experiment, the eigenfrequency of the f1-mode decreased with increasing pressure, for instance, from 568 Hz to 559 Hz, while the eigenfrequency of the f3-mode fell, for instance, from 3066 Hz to 3005 Hz.

Figure 5B:
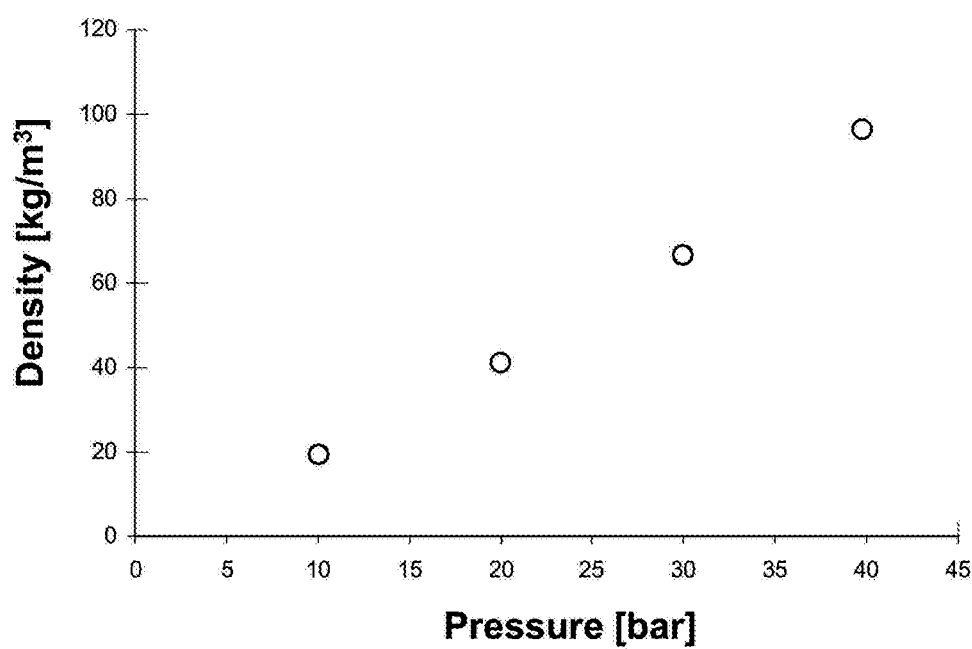
FIG. 5b shows a graph of density values ascertained with the method of the invention.

Shown in FIG. 5b are, finally, results for determining the density of $CO_2$ by means of the method of the invention in the case of different values for the static pressure, wherein the respective correcting terms for correcting the preliminary density values were ascertained based on the sound velocity values illustrated in FIG. 5a.

Correcting terms for a preliminary mass flow measured value of a Coriolis mass flow measuring device can be determined from the correcting terms for the density by determining from the correcting term $K_i$ for the density, first of all, the density error $E_{92\ i}$:

$$E_{\rho i} := K_i - 1,$$

The mass flow error $E_m$ for correcting a preliminary mass flow value amounts especially to twice the first preliminary density error $E_{\rho 1}$, thus:

$$E_m := 2 \cdot E_{\rho 1}.$$

For a correcting term $K_m$ for the mass flow, the following holds:

$$K_m := 1 + E_m,$$

wherein the corrected mass flow $\dot{m}_{corr}$ is ascertained as $$\dot{m}_{corr} = \frac{\dot{m}_v}{K_m},$$

wherein $\dot{m}_v$ is a previous mass flow value, which results from the phase difference between the signals of two oscillation sensors arranged symmetrically on the measuring tube and a calibration factor.

The invention claimed is:

1. A method for ascertaining a physical parameter of a gas, the method comprising:
   ascertaining eigenfrequencies of a f1-mode and of a f3-mode of a measuring tube of a measuring transducer, the measuring tube embodied to convey a gas and including an inlet-side end section and an outlet-side end section, wherein the measuring transducer includes at least one inlet-side securement apparatus and at least one outlet-side securement apparatus, with which the measuring tube is secured in the inlet-side and outlet-side end sections, respectively, such that the measuring tube is excitable between the inlet-side and outlet-side securement apparatuses to execute bending oscillations of different modes with different eigenfrequencies, of which the f1-mode has no oscillation nodes between the securement apparatuses and of which the f3-mode has two oscillation nodes between the inlet-side and outlet-side securement apparatuses; ascertaining a first preliminary density value for the gas conveyed in the measuring tube based on the eigenfrequency of the f1-mode;
   ascertaining a second preliminary density value for the gas conveyed in the measuring tube based on the eigenfrequency of the f3-mode;
   ascertaining a value for a velocity of sound of the gas conveyed in the measuring tube;
   ascertaining at least one correcting term dependent on the velocity of sound and the eigenfrequency of either the f1-mode or the f3-mode, and/or a density error for the first or second preliminary density value ascertained based on the eigenfrequency of the respective mode, for determining a corrected density measured value; and
   ascertaining a correcting term for a preliminary mass flow value for determining a corrected mass flow measured value based on the first preliminary density value, the second preliminary density value, the eigenfrequency of the f1-mode and the eigenfrequency of the f3-mode;
   wherein the at least one correcting term has the following form based on the eigenfrequency of the respective mode:

$$K_i := \left(1 + \frac{r}{\left(\frac{g \cdot c}{f_i}\right)^2 - b}\right),$$

wherein $$\rho_{corr} := \frac{\rho_i}{K_i},$$

wherein r and g are gas independent constants, c is the velocity of sound of the gas, $K_i$ is the at least one correcting term, f is the eigenfrequency of the respective mode, $\rho_{corr}$ is the corrected density measured value, and b is a scaling constant.

2. The method of claim 1, wherein the at least one correcting term is a function of a quotient of the velocity of sound of the gas and the eigenfrequency of the respective mode with which the first or second preliminary density measured value was ascertained.

3. The method of claim 1, wherein the velocity of sound of the gas is determined by finding that sound velocity value for which a quotient of a first correcting term for the first preliminary density value divided by a second correcting term for the second preliminary density value equals a quotient of the first preliminary density value divided by the second preliminary density value.

4. The method of claim 1, wherein r/b<1.

5. The method of claim 1, wherein r/b<0.9.

6. The method of claim 1, wherein b=1.

7. The method of claim 1, wherein g is a proportionality factor between a resonant frequency of the gas and the velocity of sound of the gas dependent on a diameter of the measuring tube, wherein $f_{res} = g \cdot c$, wherein $f_{res}$ is the resonant frequency of the gas.

8. The method of claim 1, wherein the first and second preliminary density values are determined based on the eigenfrequencies $f_j$ of the respective modes using polynomials in $1/f_i$ or $(1/f_i)^2$, wherein coefficients of the polynomials are mode dependent.

9. The method of claim 1, wherein the following holds for the density error of the first or second preliminary density value based on the eigenfrequency of the respective mode:

$E_{pi} := K_i - 1$, wherein $E_{pi}$ is the density error, and wherein a mass flow error of the preliminary mass flow value is proportional to the density error of the first preliminary density value, such that $E_m := k \cdot E_{\rho 1}$, wherein $E_m$ is the mass flow error and k is the proportionality factor that amounts to not less than 1.5 and not more than 3, wherein for the correcting term for the preliminary mass flow value, the following holds:

$K_m := 1 + E_m$, wherein $K_m$ is the correcting term for the preliminary mass flow value, and wherein the corrected mass flow measured value is ascertained as $$\dot{m}_{corr} := \frac{\dot{m}_v}{K_m},$$

wherein $\dot{m}_{corr}$ is the corrected mass flow measured value and $\dot{m}_v$ is the preliminary mass flow value.

10. The method of claim 9, wherein the proportionality factor amounts to not less than 1.9 and not more than 2.1.

11. The method of claim 1, further comprising:
determining a deviation between the first preliminary density value based on the eigenfrequency of the f1-mode and the second preliminary density value based on the eigenfrequency of the f3-mode;
testing whether the deviation is greater than a reference value; and
when the deviation is greater than the reference value, ascertaining and outputting the value for the velocity of sound.

12. The method of claim 11, wherein the reference value is selected such that the velocity of sound can be determined with a statistical error of no more than 10%.

13. The method of claim 12, wherein the reference value is selected such that the velocity of sound can be determined with a statistical error of no more than 2%.

14. The method of claim 11, wherein the reference value amounts to not less than 0.2 kg/m³ and not more than 2 kg/m³.

15. The method of claim 14, wherein the reference value amounts to not less than 0.4 kg/m³ and not more than 0.6 kg/m³.

* * * * *